United States Patent
Wynbeek

(10) Patent No.: US 6,853,835 B2
(45) Date of Patent: Feb. 8, 2005

(54) ASYMMETRIC WIRELESS COMMUNICATION SYSTEM USING TWO DIFFERENT RADIO TECHNOLOGIES

(75) Inventor: John C. Wynbeek, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 458 days.

(21) Appl. No.: 09/928,615

(22) Filed: Aug. 13, 2001

(65) Prior Publication Data

US 2003/0032422 A1 Feb. 13, 2003

(51) Int. Cl.$^7$ .................................................. H04B 1/44
(52) U.S. Cl. ............................ 455/78; 455/39; 455/91; 455/703; 375/295; 375/316
(58) Field of Search ........................... 455/39, 47, 48, 455/73, 78, 91, 104, 550.1, 553.1, 422, 456.5, 403, 552, 556; 375/295, 301, 316, 321, 324

(56) References Cited

U.S. PATENT DOCUMENTS

| | | | |
|---|---|---|---|
| 5,345,471 A | 9/1994 | McEwan | 375/1 |
| 5,517,198 A | 5/1996 | McEwan | 342/89 |
| 5,523,760 A | 6/1996 | McEwan | 342/89 |
| 5,630,216 A | 5/1997 | McEwan | 455/215 |
| 5,677,927 A | 10/1997 | Fullerton | |
| 5,687,169 A | 11/1997 | Fullerton | 370/324 |
| 5,764,696 A | 6/1998 | Barnes et al. | 375/239 |
| 5,832,035 A | 11/1998 | Fullerton | 375/210 |
| 5,960,031 A | 9/1999 | Fullerton et al. | 375/200 |
| 5,963,581 A | 10/1999 | Fullerton et al. | 375/200 |
| 5,995,534 A | 11/1999 | Fullerton et al. | 375/200 |
| 6,031,862 A | 2/2000 | Fullerton et al. | 375/200 |
| 6,091,715 A | 7/2000 | Vucetic et al. | 370/277 |
| 6,351,652 B1 * | 2/2002 | Finn et al. | 455/552.1 |
| 6,519,464 B1 * | 2/2003 | Santhoff et al. | 455/456.5 |
| 2002/0128039 A1 * | 9/2002 | Finn | 455/556 |
| 2003/0036374 A1 * | 2/2003 | English et al. | 455/403 |

FOREIGN PATENT DOCUMENTS

WO    WO01/31929    5/2001

* cited by examiner

Primary Examiner—Cong Van Tran

(57) ABSTRACT

A wireless communication system and method are provided, where a base station communication device includes a carrier wave-based transmitter and an ultrawideband receiver. A mobile communication device includes a carrier wave-based receiver and an ultrawideband transmitter. Carrier wave communications are carried out in a forward channel from the base station communication device to the mobile communication device, and ultrawideband communications are carried out in a reverse channel from the mobile communication device to the base station communication device. As a result, the power requirements of the mobile communication device are significantly reduced.

13 Claims, 3 Drawing Sheets

ASYMMETRIC WIRELESS COMMUNICATION SYSTEM USING TWO DIFFERENT RADIO TECHNOLOGIES

FIELD OF THE INVENTION

The present invention relates generally to a wireless communication system, and more particularly to an asymmetric wireless communication system that uses two different radio technologies.

BACKGROUND OF THE INVENTION

Many types of modern communication systems have been developed. One type of communication system that is enjoying increased popularity is wireless radio frequency (RF) communications. Wireless RF communication systems operate by transmitting radio frequency waves between devices. A wireless communication system offers advantages of convenience, a very high degree of mobility, economy (no need for land lines), and long range. Wireless communication systems may include mobile communication devices such as radio communication devices, cellular phones, satellite phones, two-way pagers, personal digital assistants (PDAs), laptop computers with wireless modems, etc.

A wireless communication system may include one or more base stations and one or more mobile communication devices that communicate with each other or with other communication devices via the base stations. A mobile communications device is typically battery powered and includes a transmitter and receiver. The mobile communication devices may move freely while maintaining radio contact with the closest base station. In addition, wireless communication systems may include multiple base stations that are linked together by land lines, such as telephone lines, etc. This allows geographically separated users to communicate by relaying signals between mobile communication devices and between base station communication devices.

FIG. 1 shows a prior art wireless communication system that includes a base station communication device 105 and a mobile communication device 115. The prior art base station 105 includes a carrier wave-based transmitter 106 and a carrier wave-based receiver 107. Likewise, the mobile communication device 115 employs a carrier wave-based transmitter 116 and a carrier wave-based receiver 117. The carrier wave-based transmitters and receivers are devices that employ a modulated RF carrier wave. The modulated RF carrier wave may be used to communicate information between a transmitter and a receiver, including voice and data.

The prior art wireless RF communication system has several drawbacks. In the prior art, one of the largest limitations of a mobile communication device 115 has been the power source, i.e., the battery. Typical batteries do not store enough electrical power to transmit and receive over long periods of time. Therefore, conserving battery power is always a consideration in a mobile communication device 115. This problem is often exacerbated by continuously transmitting a signal, even when data is not being communicated, wasting valuable electrical power.

Another drawback of the prior art is that a carrier wave-based transmitter requires a relatively high power output in order to ensure that the transmitted signal is distinguishable from noise. This is in contrast to a carrier wave-based receiver, which requires only a modest amount of electrical power in order to receive a RF signal and recover any information therein. The relatively large transmit power is not suitable in light of the relatively short battery life of a mobile communication device 115. Therefore, in the prior art mobile communication device 115 the battery must be large and heavy in order to supply the required electrical power.

Yet another drawback is that the mobile communication device 115 of the prior art must supply about the same transmit and receive power as the prior art base station communication device 105.

Therefore, there remains a need in the art for improvements in wireless communication systems.

SUMMARY OF THE INVENTION

A wireless communication system comprises a base station communication device including a carrier wave-based transmitter and further including an ultrawideband receiver. The wireless communication system further comprises a mobile communication device including a carrier wave-based receiver and further including an ultrawideband transmitter. Much less power is required for ultrawideband transmission than for carrier wave transmission. Accordingly, less power is consumed by the mobile communication device. Conversely, since more power is required for ultrawideband reception than carrier wave reception, communication from the base station communication device to the mobile communication device is carried out by carrier wave transmission.

DETAILED DESCRIPTION

Figure 1:
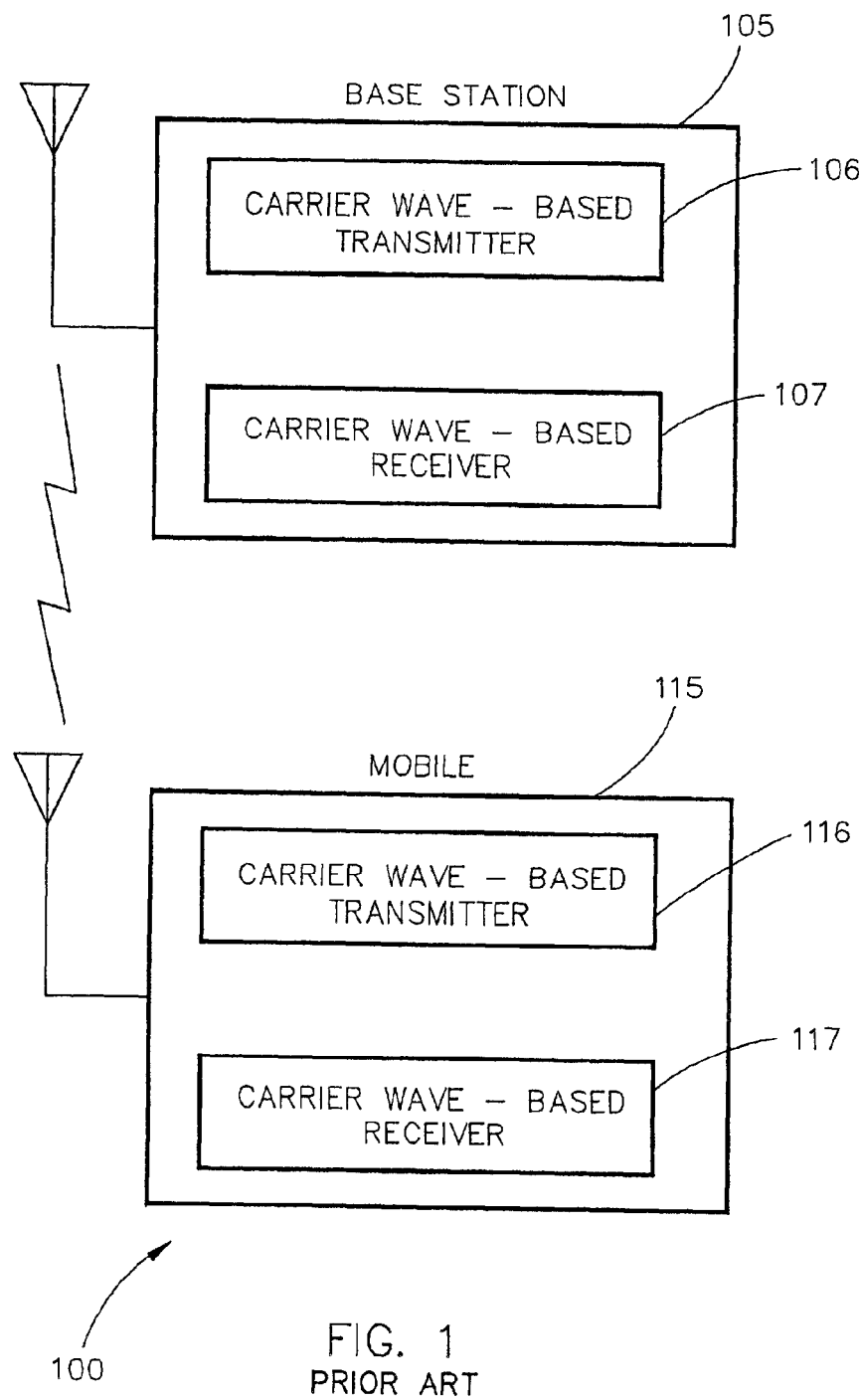
FIG. 1 shows a prior art wireless communication system that includes a base station communication device and a mobile communication device.
Figure 2:
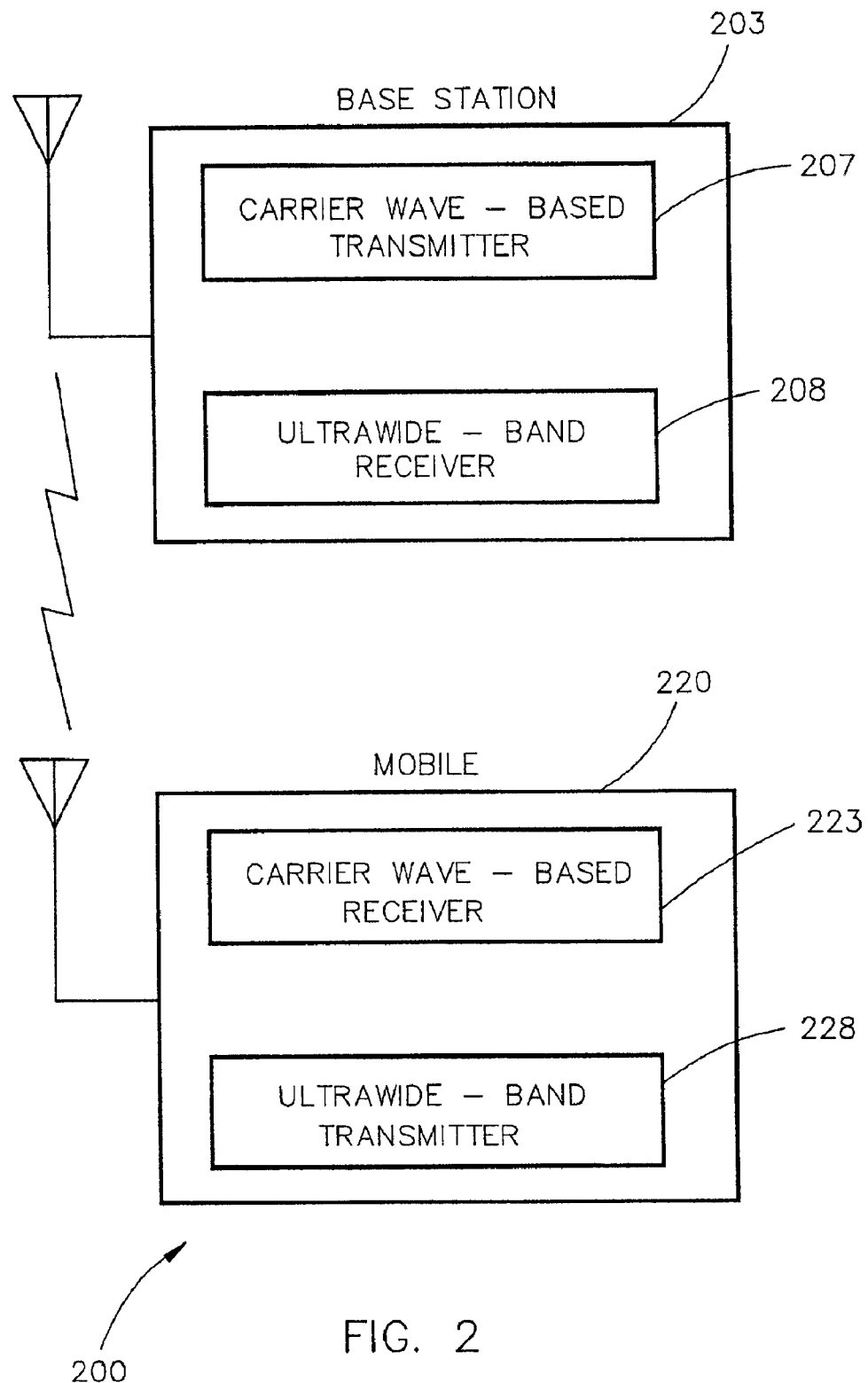
FIG. 2 is a block diagram of an asymmetric wireless communication system according to one embodiment of the invention.

FIG. 2 is a block diagram of an asymmetric wireless communication system 200 according to one embodiment of the invention. The wireless communication system 200 uses two different radio technologies. The wireless communication system 200 includes at least one base station communication device 203 and at least one mobile communication device 220. The base station communication device 203 includes a carrier wave-based transmitter 207 and an ultrawideband receiver 208. The mobile communication device 220 includes a carrier wave-based receiver 223 and an ultrawideband transmitter 228.

The carrier wave-based transmitter 207 and the carrier wave-based receiver 223 are a traditional transmitter/receiver that modulate and demodulate a carrier wave, as is known in the art. The transmitter 207 and receiver 223 may include heterodyne, superheterodyne, or direct conversion radios, or any other type of carrier wave-based radio.

Figure 3:
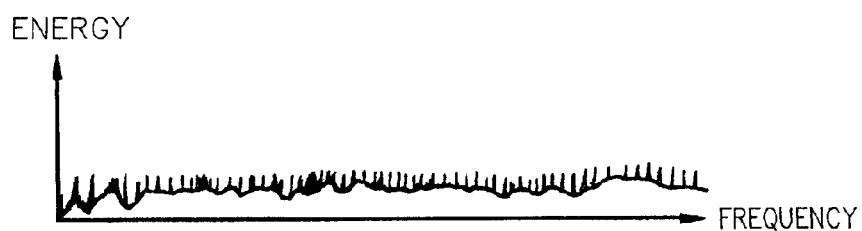
FIG. 3 is a graph of ultrawideband pulses in the frequency domain.

FIG. 3 is a graph of ultrawideband pulses in the frequency domain. The ultrawideband receiver 208 and ultrawideband transmitter 228 communicate using a train of wideband pulses. Unlike carrier wave-based communications, the ultrawideband transmission employs a large plurality of pulses of a small amplitude. The pulses are precisely timed and are generally about one cycle in duration. Therefore, the pulses are extremely short in duration and are of an ultra-wide bandwidth. As a result, each pulse may contain a large spectrum of frequencies. The bandwidth of an ultrawideband transmission may be more than 100% of the center frequency.

In addition, the pulses are transmitted at a very low power. The pulses are generally transmitted at a power level that is approximately the same as typical background noise. Moreover, because an ultrawideband transmitter packs information into extremely small pulses, it typically operates only a fraction of the time. The ultrawideband transmitter is not continuously or frequently transmitting as in a conventional carrier wave-based transmitter. The result is a transmission technology that employs a very low transmission power level. As a consequence, an ultrawideband transmission is highly resistant to jamming and interception.

Ultrawideband transmitters employ pulse position modulation (PPM) in order to encode data. In PPM, two (chronologically) different pulse positions are employed. The receiver can receive the pulses and decode the information therein by traditional PPM techniques.

Ultrawideband communication transmitters and receivers are available from Time Domain Corporation, Huntsville, Ala.

The most significant benefit of an ultrawideband transmitter is that it requires a very low transmission power, typically a maximum of about 50 microwatts. In comparison, a typical carrier wave-based transmitter may require anywhere from 1 to 100 milliwatts for a typical handheld wireless device.

The downside of the ultrawideband communication system is that instead of requiring a large amount of power in the transmitter, the power requirement of the ultrawideband communication system is centered in the receiver. The receiver requires a number of high speed correlators and high speed processing in order to recover the embedded data. A typical ultrawideband receiver therefore requires about 50 milliwatts in order to receive and decode the ultrawideband signal. In comparison, a carrier wave-base receiver requires about 1 milliwatt.

One reason that so much receive power is required is because of the ultrawideband nature of the transmitted pulses. The pulses are spread over about 1 to about 3 GigaHertz (GHz) of bandwidth. Therefore, the ultrawideband receiver requires a significant amount of signal processing and filtering in order to decode the digital data embedded therein.

In operation, communications from the base station communication device 203 are transmitted to the mobile communication device 220 using a traditional carrier wave-based transmission signal. This may include AM or FM modulation, for example. In contrast, communications from the mobile communication device 220 to the base station communication device 203 are conducted using an ultrawideband transmission pulse train.

The asymmetric transmission and receive capability according to the invention may be applied to any wireless communication system. The invention may apply to radio systems, cellular telephone systems, satellite telephone systems, laptop computers with wireless modems, two-way pagers, PDAs, etc. The invention is most beneficial when a mobile communication device 220 uses battery power or any self-contained power source of limited capacity, such as fuel cells, etc. Furthermore, the invention applies to any wireless communication system employing one or more base station communication devices 203. According to the invention, a majority of the transmit and receive power requirement may be shifted away from the mobile device so that a base station communication device 203 provides a large proportion of the transmit and receive power.

The invention differs from the prior art wireless systems in that prior art devices typically use either exclusively carrier wave-based systems or exclusively ultrawideband systems. However, none use an advantageous combination of both, as in the invention, where one type is used for communication in one direction and the other type is used for communication in the opposite direction.

The wireless communication system 200 according to the invention therefore retains a low power receive capability in the mobile communication device 220 while simultaneously gaining a low power transmit capability. This shifts a large proportion of the power requirement from the mobile communication device 220 to the base station communication device 203. This shifting is acceptable, as the base station communication device 203 is typically connected to an external and continuous source of power, such as an alternating current (AC) power line. The battery life of the mobile communication device 220 is thereby extended, and the weight and size of the mobile communication device 220 may be reduced.

Figure 4:
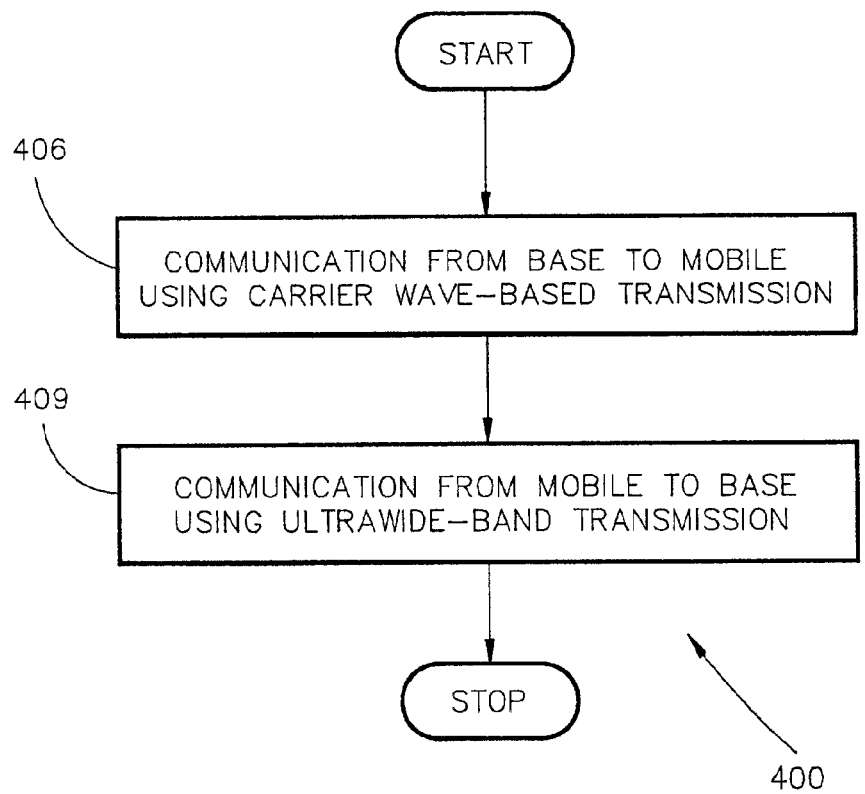
FIG. 4 is a flowchart of a communication method in a wireless communication system according to one embodiment of the invention.

FIG. 4 is a flowchart 400 of a communication method in a wireless communication system according to one embodiment of the invention. In step 406, communication from the base station communication device 203 to the mobile communication device 220 is conducted using a carrier wave-based transmission.

In step 409, a wireless communication from the mobile communication device 220 to the base station communication device 203 is conducted using an ultrawideband transmission.

I claim:

1. A wireless communication system, comprising:
   a base station communication device including a carrier wave-based transmitter and further including an ultrawideband receiver; and
   a mobile communication device including a carrier wave-based receiver and further including an ultrawideband transmitter;
   wherein carrier wave communications are carried out in a forward channel from said base station communication device to said mobile communication device, and ultrawide band communications are carried out in a reverse channel from said mobile communication device to said base station communication device.

2. The wireless communication system of claim 1, wherein said wireless communication system comprises a radio system.

3. The wireless communication system of claim 1, wherein said wireless communication system comprises a cellular telephone system.

4. The wireless communication system of claim 1, wherein said wireless communication system comprises a satellite telephone system.

5. The wireless communication system of claim 1, wherein said wireless communication system comprises a pager system.

6. The wireless communication system of claim 1, wherein said base station communication device is connected to a land line.

7. A wireless communication system, comprising:

a base station communication device including a carrier wave-based transmitter capable of transmitting a carrier wave-based signal and further including an ultrawideband receiver capable of receiving an ultrawideband signal; and a mobile communication device including a carrier wave-based receiver capable of receiving said carrier wave-based signal and further including an ultrawideband transmitter capable of transmitting said ultrawideband signal.

8. The wireless communication system of claim 7, wherein said wireless communication system comprises a radio system.

9. The wireless communication system of claim 7, wherein said wireless communication system comprises a cellular telephone system.

10. The wireless communication system of claim 7, wherein said wireless communication system comprises a satellite telephone system.

11. The wireless communication system of claim 7, wherein said wireless communication system comprises a pager system.

12. The wireless communication system of claim 7, wherein said base station communication device is connected to a land line.

13. A method of wireless communication, comprising the steps of:

carrying out communication from a base station communication device to a mobile communication device using a carrier wave-based transmission signal; and carrying out communication from said mobile communication device to said base station communication device using an ultrawideband transmission pulse train.

* * * * *